United States Patent
Degelman

(12) 
(10) Patent No.: US 6,460,643 B1
(45) Date of Patent: Oct. 8, 2002

(54) MULTI-FUNCTIONAL SELF-PROPELLED FARM TRACTOR

(76) Inventor: Wilfred J. Degelman, P.O. Box 830, 272 Industrial Drive, Regina Sask (CA), S4P 3B1

( * ) Notice: Subject to any disclaimer, the term of this patent is extended or adjusted under 35 U.S.C. 154(b) by 0 days.

(21) Appl. No.: 09/595,011

(22) Filed: Jun. 16, 2000

(30) Foreign Application Priority Data

May 9, 2000 (CA) .............................................. 2307926

(51) Int. Cl.⁷ .............................................. B62D 49/06
(52) U.S. Cl. ...................... 180/89.12; 180/235; 180/900
(58) Field of Search .............................. 180/89.12, 235, 180/242, 308, 900, 418; 280/400, 515, 6.154, 6.155

(56) References Cited

U.S. PATENT DOCUMENTS

| | | | |
|---|---|---|---|
| 3,154,164 A | * 10/1964 | Shaw et al. .................. | 180/209 |
| 3,236,456 A | 2/1966 | Ackley et al. ............... | 239/168 |
| 3,878,911 A | 4/1975 | Nichols ........................ | 180/51 |
| 3,976,302 A | 8/1976 | Hammarstrand ........... | 280/6 H |
| 3,995,569 A | * 12/1976 | Picardat ........................ | 111/12 |
| 4,236,591 A | 12/1980 | Molby .......................... | 180/41 |
| 4,591,018 A | * 5/1986 | Van Der Lely ............. | 180/260 |
| 4,658,572 A | 4/1987 | Honey et al. ................. | 56/228 |
| 4,734,006 A | 3/1988 | Krob et al. .................. | 414/719 |
| 4,754,815 A | * 7/1988 | Brouwer et al. ............. | 172/2 |
| 4,783,089 A | 11/1988 | Hamilton et al. ........... | 280/6 R |
| 4,809,805 A | * 3/1989 | Short ........................... | 180/139 |
| 5,031,394 A | 7/1991 | Honey .......................... | 56/228 |
| 5,092,422 A | 3/1992 | Hood, Jr. et al. ........... | 180/329 |
| 5,180,028 A | * 1/1993 | Perrenoud, Jr. ............. | 180/235 |
| 5,209,320 A | * 5/1993 | Harrer ......................... | 180/235 |
| 5,366,337 A | * 11/1994 | Eriksson ..................... | 414/550 |

FOREIGN PATENT DOCUMENTS

WO    WO 91/04902    * 4/1991    .................. 180/235

OTHER PUBLICATIONS

Brochure entitled "New Holland Bidirectional Tractor", *New Holland North America, Inc.*, 1998, U.S.A.
Brochure entitled "New Holland Bidirectional 102 PTO hp Tractor", *New Holland North America Inc.*, 1995, U.S.A.

* cited by examiner

*Primary Examiner*—Paul N. Dickson
*Assistant Examiner*—David R. Dunn
(74) *Attorney, Agent, or Firm*—Davis & Bujold, P.L.L.C.

(57) ABSTRACT

A high clearance farm tractor is capable of accepting different front attachments to enable it to operate as either a swather or a sprayer. The front and rear sections of the vehicle's chassis are connected by an articulating oscillating joint which permits the vehicle's rear wheels to follow the path of the front wheels while turning thereby reducing damage to crops. The oscillating nature of the joint improves traction by allowing the wheels to always have full contact with the ground. A rear mounted engine counterbalances the weight of a front mounted attachment such as a swather head. The mounting of the cab on the front section of the vehicle away from the engine reduces noise experienced by the operator and permits the operator to have a direct line of sight to the operation of the vehicle. The use of active suspension and chemical application rates permit the vehicle to be transported and operated at higher speeds.

17 Claims, 7 Drawing Sheets

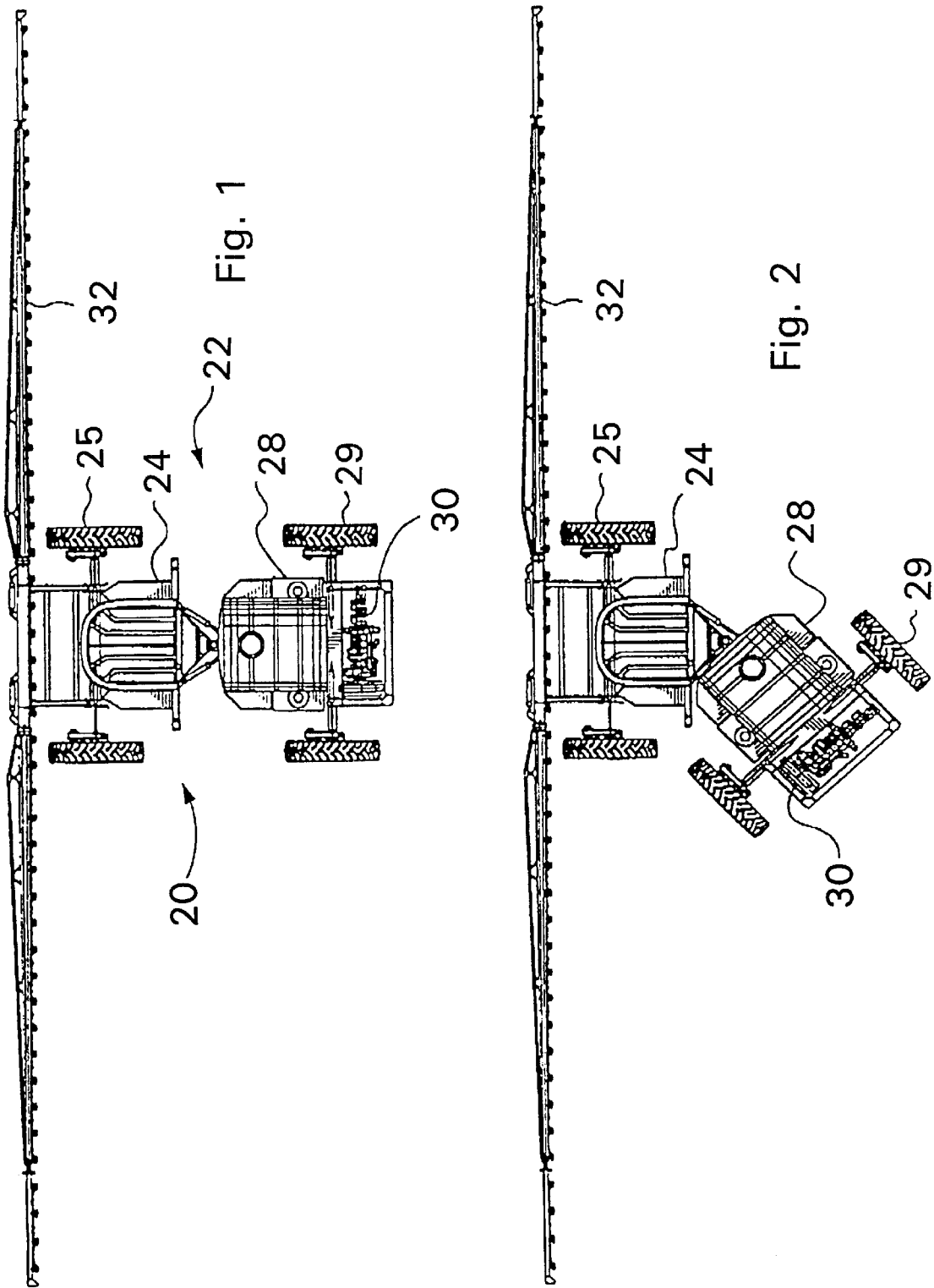

MULTI-FUNCTIONAL SELF-PROPELLED FARM TRACTOR

BACKGROUND OF THE INVENTION

The present invention relates to a vehicle having an articulated chassis and particularly to a high clearance farm tractor having an improved chassis arrangement and interchangeable front mounted attachments enabling the tractor to perform a variety of functions.

DESCRIPTION OF THE PRIOR ART

Vehicles, including farm tractors, having an articulated chassis are known. Although such conventional vehicles may be adequate for their intended purposes under many conditions, they suffer from various performance related limitations.

For example, U.S. Pat. No. 3,976,302 granted to Hammarstrand on Aug. 24, 1976 describes a vehicle with a chassis having articulated front and rear sections and an axle system which permits the front and rear sections to oscillate. Although this machine is suited for use in difficult terrain, the conventional placement of a rear cab and a forward engine does not make it suitable for operations such as swathing and spraying. The axle system described may also be disadvantageously configured or unnecessarily complicated for farm use.

SUMMARY OF THE INVENTION

It is an object of the present invention to overcome such difficulties present in conventional articulated vehicles. It is another object of the present invention to improve the stability of the farm tractor while providing improved handling and comfort to the operator. A further object is to reduce crop damage caused by the vehicle during operations such as swathing.

Advantages of the present vehicle include reduced crop damage caused by the vehicle, a higher clearance, higher speeds both during operation and transport, increased stability and manoeuvrability and better operator comfort and visibility.

According to a first aspect of the present invention, there is provided a vehicle capable of receiving interchangeable front mounted attachments, the vehicle comprising: a chassis having a front section and a rear section, each section supported by respective wheels; active suspension means for mounting the wheels to the chassis; an operator's cab mounted on the front section; means on the front section for mounting interchangeably one of a plurality of different attachments; an engine mounted on the rear section for propelling the vehicle; and an oscillating articulated joint connecting the front and rear sections, wherein the front and rear wheels are spaced from the joint so that the path of the rear wheels substantially follows the path of the front wheels when the vehicle turns.

BRIEF DESCRIPTION OF THE DRAWINGS

The present invention will be further described with reference to the accompanying drawings in which:

FIG. 1 illustrates a plan view of a farm tractor according to a first embodiment of me present invention;

FIG. 2 illustrates a plan view of the farm tractor of FIG. 1 in a turning position;

DETAILED DESCRIPTION OF THE PREFERRED EMBODIMENTS

Figure 7:
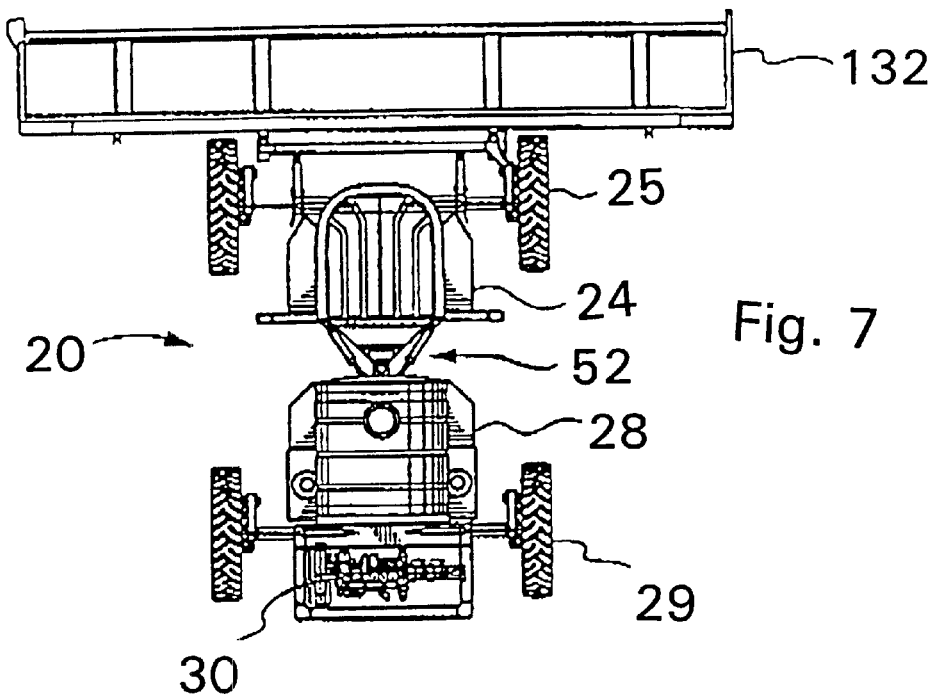
FIG. 7 illustrates a plan view of the farm tractor according to a second embodiment wherein the farm tractor is provided with a swather head attachment.
Figure 8:
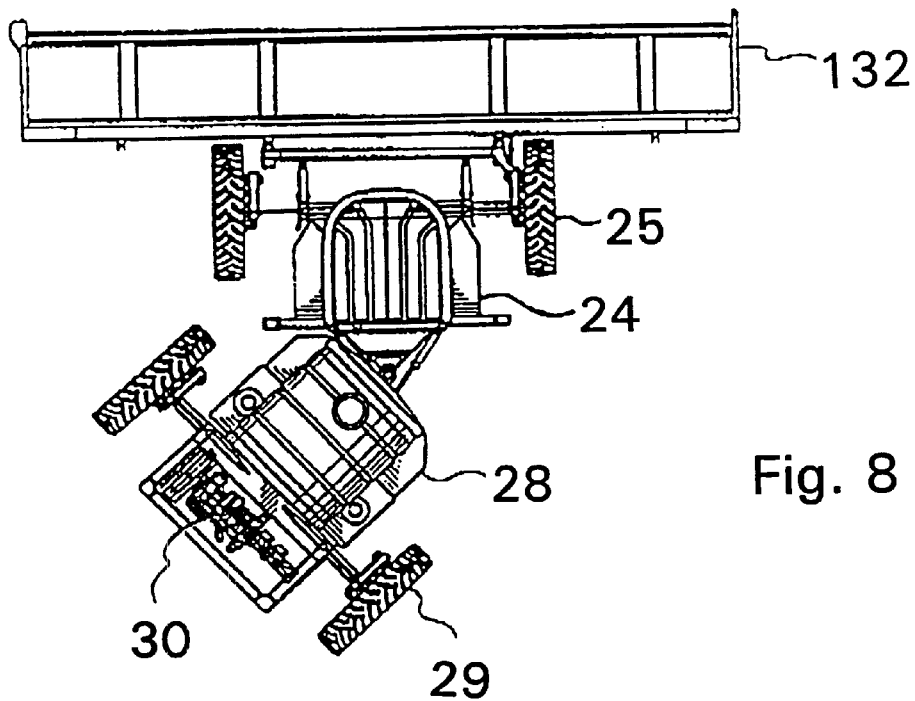
FIG. 8 illustrates a plan view of the farm tractor of FIG. 7 in a turning position.

Referring to FIGS. 1 to 5, according to a first embodiment of the present invention, a vehicle, namely a farm tractor 20 has a chassis or frame 22 comprising a front section 24 supporting an operator's cab 26 and a rear section 28 supporting an engine 30. The front section 24 is adapted for mounting different attachments such as a high clearance sprayer boom 32 as in the present embodiment or a swather head 132 as in FIGS. 7 to 9. It is possible to provide additional attachments such as an attachment to permit the vehicle 20 to function as a front-end loader.

The front and rear sections 24, 28 are supported by corresponding front and rear wheels 25, 29 mounted using active suspension. The active suspension may be any known means but in the present embodiment, the active suspension is an air spring or air bag suspension system 34. Active suspension keeps spray pattern consistent i.e. a fanned spray pattern and chemical distribution must be kept uniform and application rates should be consistent. It is critical that the sprayer boom 32 remains at a given height above the plant at high speed. As topographical irregularities are absorbed by the active suspension, the height of the spray nozzles and the size of the spray pattern relationship to the plant is more even. The use of active suspension permits higher vehicle speeds of 10 to 20 mph as opposed to speeds of 4 to 10 mph of some other vehicles and greater operator comfort during transportation or operation of the vehicle 20.

Figure 5:
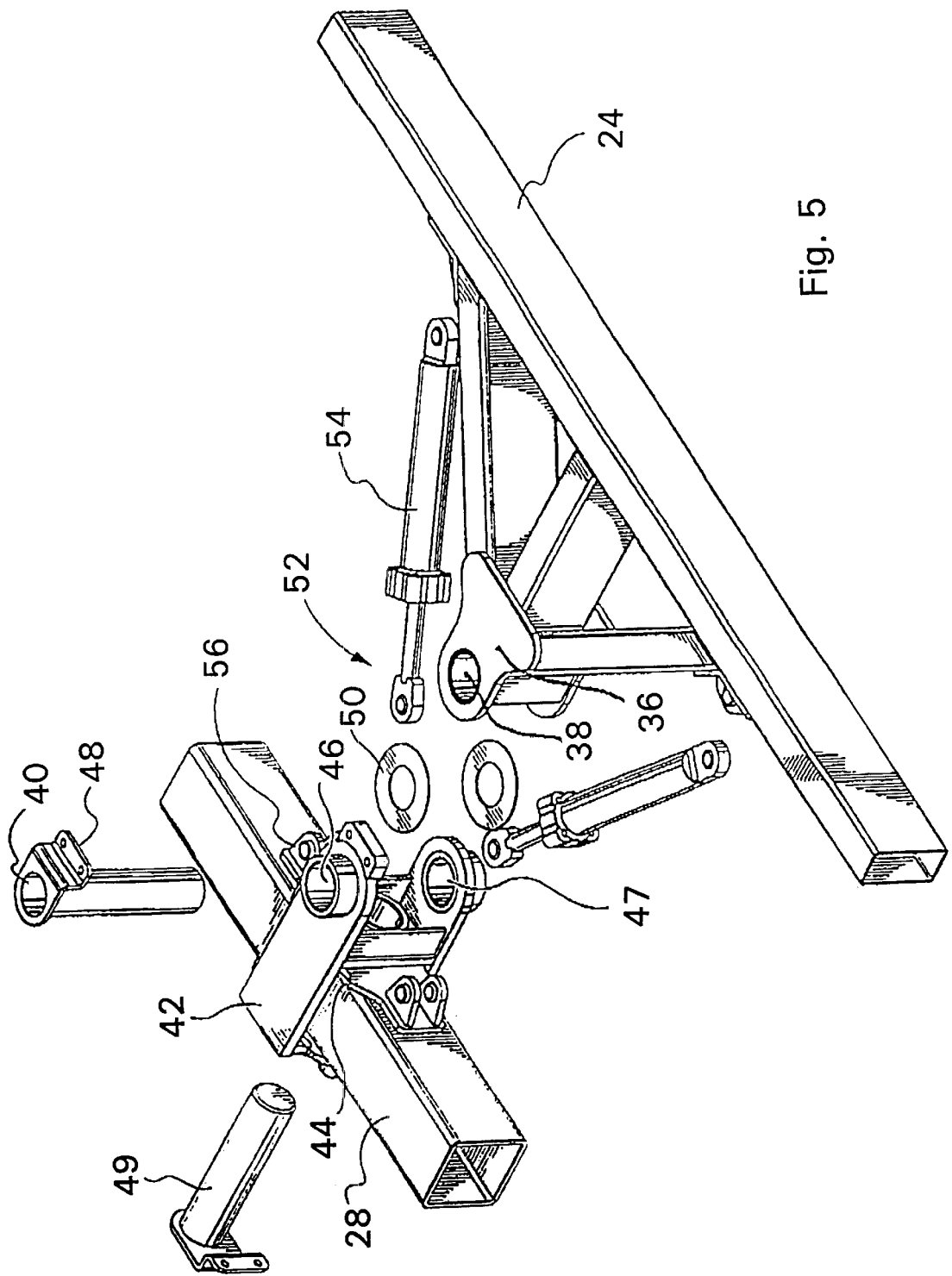
FIG. 5 illustrates an enlarged exploded view of a portion of the farm tractor of FIG. 1 showing a joint connecting the front and rear sections of the frame.
Figure 6:
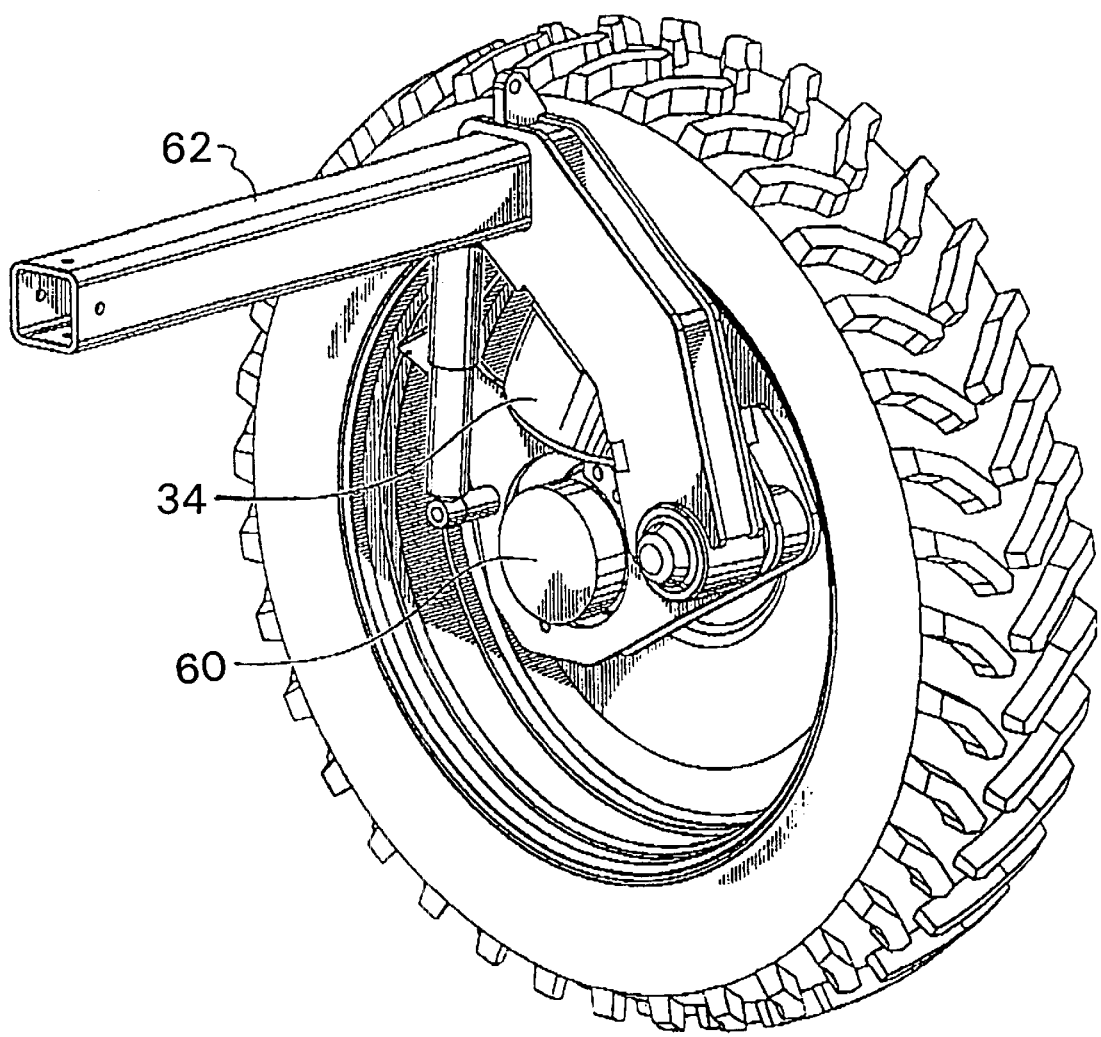
FIG. 6 illustrates an enlarged view of a portion of the farm tractor of FIG. 1 showing a wheel and its suspension and drive mechanism.

The front and rear sections 24, 28 are jointed in an oscillating articulated manner. Referring to FIG. 5, extending from the rear portion of the front section 24 is a pin receiving member 36 which may be either integrally formed as part of the front section 24 or attached by welding, for example. The pin receiving member 36 has a vertically oriented sleeve 38 for receiving a vertical pin 40.

Referring to FIG. 5, an oscillating joint member 42 is attached to the front portion of the rear section 28 and the joint member 42 is capable of pivoting about a longitudinal horizontal axis relative to the rear section 28. Oscillating joint stops 44 are provided on the rear section 28 to define the range of movement of the joint member 42 relative to the rear section 28. Top and bottom portions of the joint member 42 are each provided with respective openings 46, 47 so that top and bottom openings 46, 47 may be placed respectively above and below the openings of the sleeve 38 permitting the vertical pin 40 to be inserted through the top opening 46, the sleeve 38 and then the bottom opening 47 so as to form a pivoting joint. The vertical pin 40 is provided with a flange 48 as shown for attachment to the joint member, by fastening means such as screws or bolts. Thrust washers 50 may be placed immediately above and below the sleeve 38 to relieve friction and distribute pressure.

A similar arrangement may be used, as illustrated in FIG. 5, to pivotally connect the joint member 42 to the rear section 28 using horizontal pin 49.

Collectively these elements define a joint 52 which permits the front and rear sections 24, 28 to move relative to each in an articulated manner in the horizontal plane and to move relative to each other or oscillate about a horizontal axis. In order to stabilize the relative movements of the front and rear sections 24, 28 in the horizontal plane and to facilitate articulated steering, stabilizing cylinders 54 are provided on either side of the joint 52 by attachment to cylinder lugs 56 as illustrated in FIG. 5.

This arrangement reduces side slip in the field by permitting the vehicle 20 to pivot about its centre, when for example, turning upward on a hillside or speed momentum will drive the mass of the vehicle 20 in the direction of the frame. Rather than turning with the front wheels 25 and pivoting about the rear wheels 29 as is the case with traditional steering, articulated steering, in effect, permits turning with both front and rear wheels 25, 29 so that the vehicle 20 turns around its centre of mass.

In addition, the front wheels 25 and rear wheels 29 are substantially equidistantly spaced from the joint 52 thereby permitting the rear wheels 29 to follow the front wheels 25 while turning, thus reducing crop damage. In addition, the front and rear sections 24, 28 of the frame 22 follow the same trajectory as contrasted with traditional automotive steering. With traditional automotive steering, when the vehicle 20 turns the direction of an attachment such as a swather header includes a lateral or sideways component. The result is that the side surface of the attachment such as a swather header sweeps 132 over the crop causing potential damage. This is not the case with the articulated steering of the vehicle 20 of the present invention. The attachment travels in the direction of the vehicle 20 directly into the crop at all times, even when turning.

The oscillating nature of the joint 52 improves the contouring capability of the vehicle 20 during swathing and other operations and increases traction by allowing the wheels 25, 29 to always have full contact with the ground. Stress and fatigue to the frame 22 of the vehicle 20 and reduction in movement of the sprayer boom 32 are also decreased by permitting independent movement of the front and rear sections 24, 28.

Figure 3:
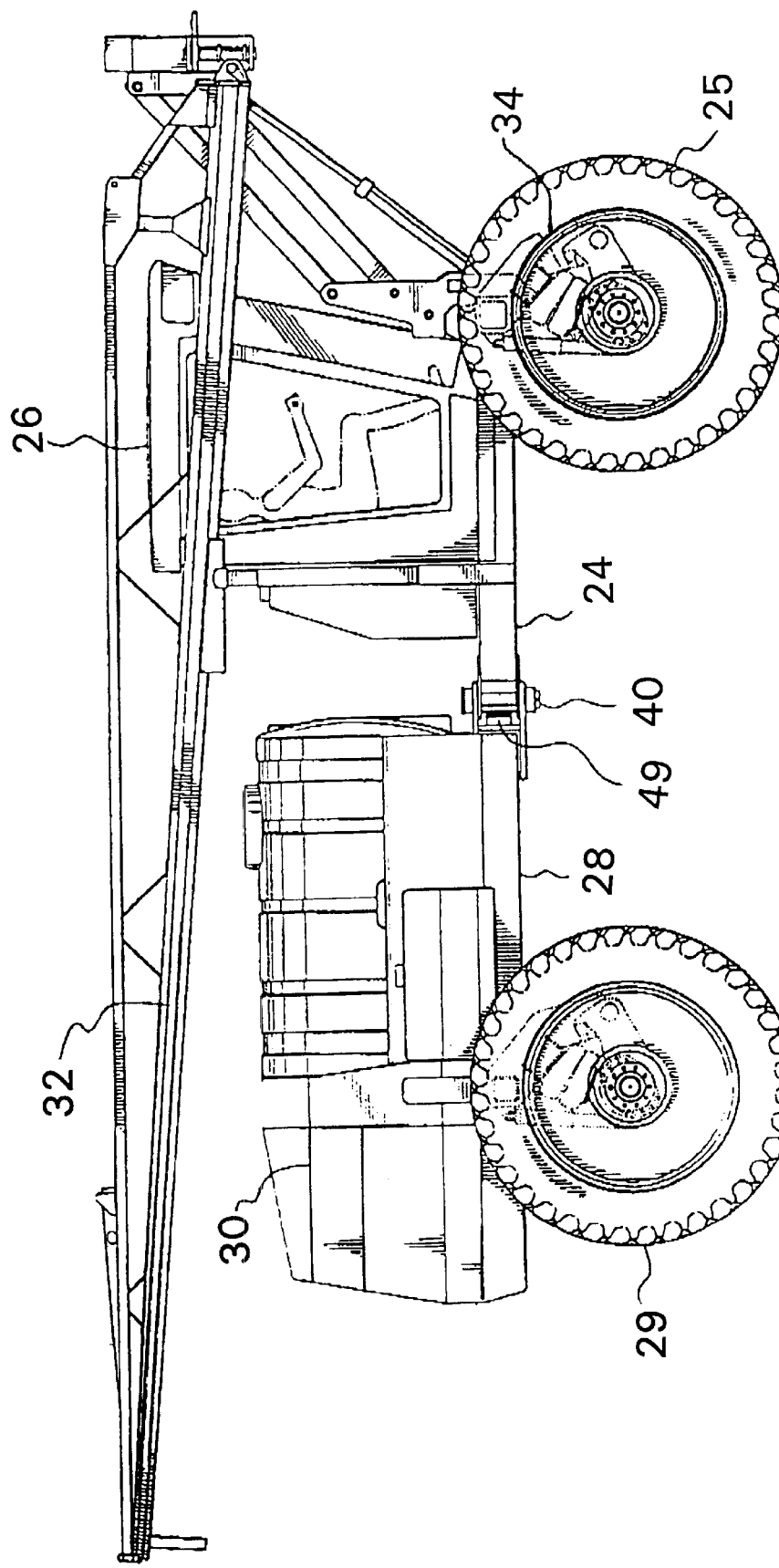
FIG. 3 illustrates an elevation side view of the farm tractor of FIG. 1.
Figure 4:
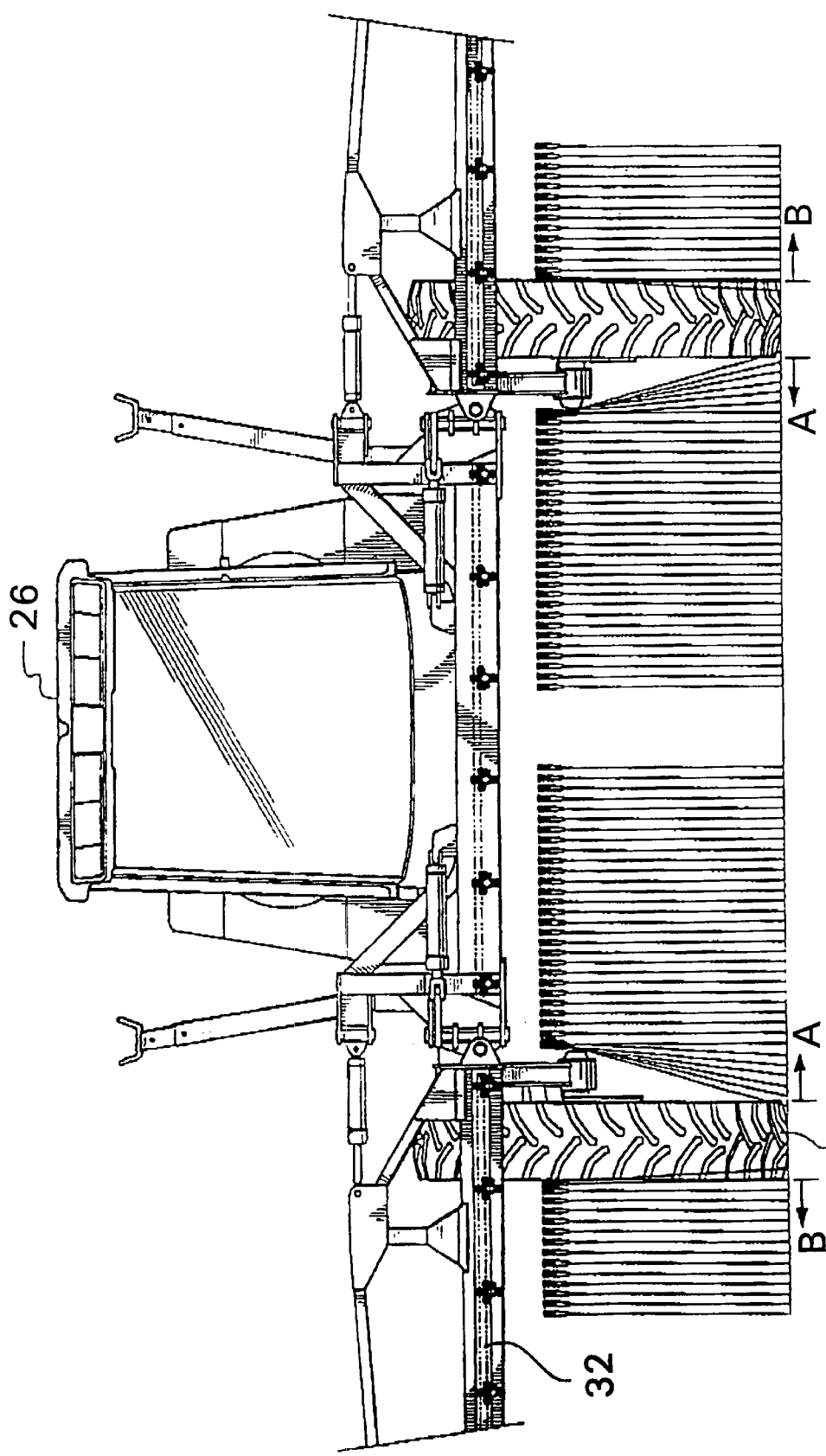
FIG. 4 illustrates a front view of the farm tractor of FIG. 1.

Instead of a conventional mechanical drive employing a differential, the present vehicle 20 is equipped with a hydrostatic drive. In place of the traditional automotive engine, the engine 30 drives a hydrostatic oil pump which feeds oil to power four separate motors 60 each mounted to a wheel. This arrangement also removes the need for a transmission and a differential. By eliminating the transmission and the differential, the clearance of the vehicle 20 can be substantially increased as shown in FIG. 3. In addition, as discussed below, the use of a hydrostatic drive permits an adjustable wheel stance, which is not possible with a typical mechanical drive.

Figure 9:
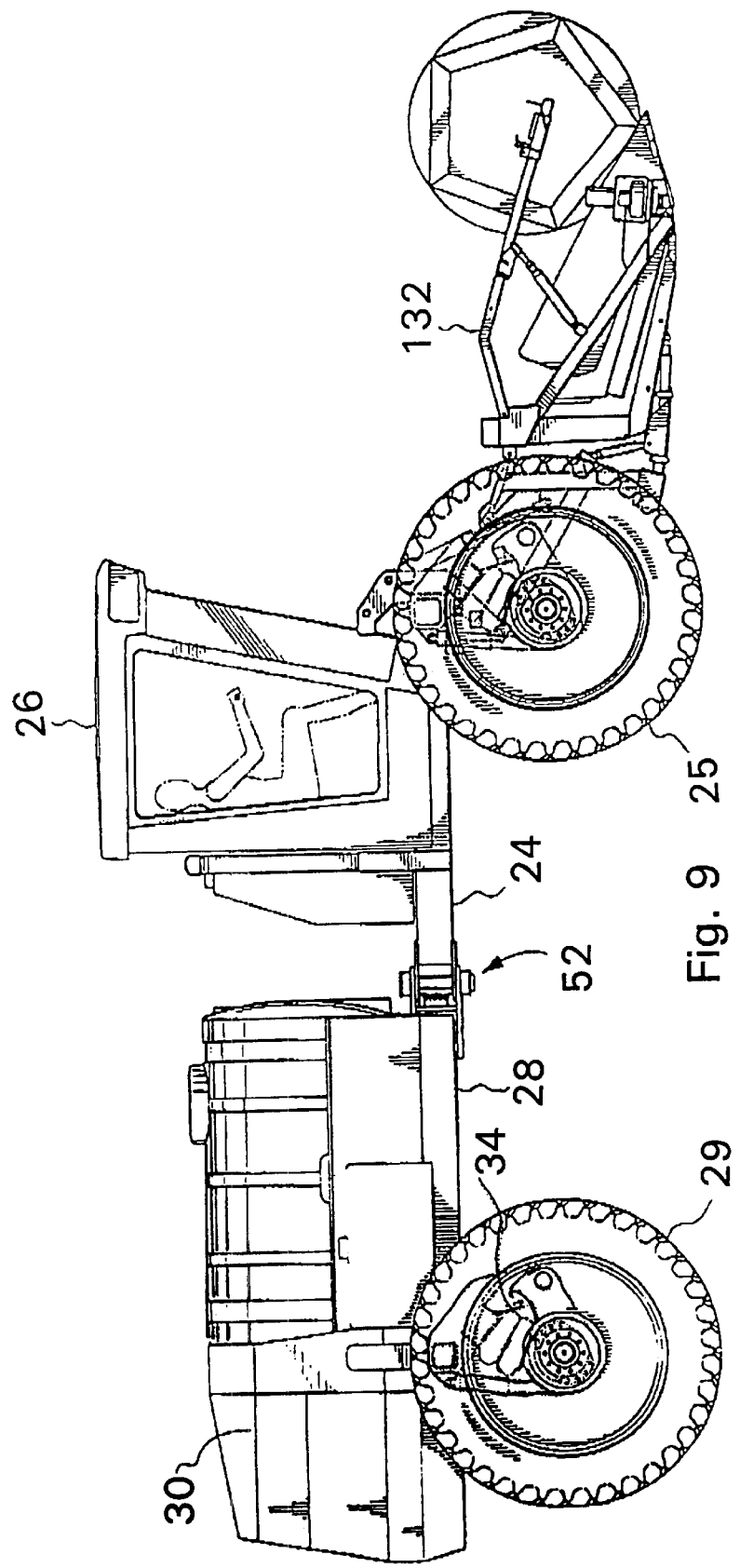
FIG. 9 illustrates an elevation side view of the farm tractor according to FIG. 7.

The vehicle 20 is also equipped with a conventional active air bag suspension system 34 as shown in FIG. 9. The air pressure can be kept constant in the air suspension system by means of an air compressor (not shown) which is powered by the engine 30. Such conventional active suspension systems are well known in the art. In such conventional active air bag suspension systems, compressed air is fed into the active suspension system by the air compressor. When the position of the wheels changes, relative to the chassis, the active suspension system adjusts the air pressure in the suspension system to match, by either The engine 30 is mounted on the rear section 28. The rear placement of the engine 30 counterbalances the weight of the front mounted attachment thereby increasing the stability of the vehicle 20, The rear placement of the engine 30 away from the attachments facilitates the mounting and removal of the attachments since during those operations the operator need not work around the engine, the hood or the frame as in some conventional designs.

A cab 26 for the operator is forwardly mounted on the front section 24 providing the operator with a direct line of sight to the front attachment facilitating the operation of the vehicle 20 when the front attachment is being mounted, removed or changed. In particular, when mounting an attachment, the operator can manoeuver the vehicle 20 so as to align the attachment pins or attachment means of the vehicle 20 with a corresponding mechanism in the attachment itself without the inconvenience of leaving the cab 26 to ensure a correct alignment. Of course, if required, the operator can leave the cab to manually hook up hoses, hydraulics, electrical or other system components of the particular attachment. The cab forward design also provides a direct line of sight to the attachment when the vehicle 20 is operating in the field. In addition, the forward position of the cab 26 away from the engine 30 decreases the level of noise experienced by the operator and increases the operator's comfort.

By virtue of the engine 30 discussed above, the vehicle 20 has a relatively high frame 22 compared with many conventional vehicles resulting in a high clearance and reducing the amount of damage to crops. For example, referring to FIG. 5, according to the present embodiment the frame 22 is mounted so as to be approximately 5 feet from the ground as compared with a more typical clearance of 18 inches found in some conventional vehicles. When one considers that canola, a typical dryland farming crop, stands approximately 3 to 6 feet high, it is easy to appreciate that the potential damage to such a crop is reduced by the use of present vehicle when compared to conventional low clearance vehicles.

The wheels 25, 29 of the vehicle 20 may also be relatively narrow. For example, they may be as narrow as 12 inches wide as opposed to a more typical value of 24 inches. This in conjunction with the high frame 22 reduces the area of contact between the vehicle 20 and the crop thereby further reducing potential damage to crops. Both front and rear wheels 25, 29 are mounted to the frame 22 by use of the slide tubes 62 so as to permit adjustment of the wheel stance i.e. the distance between the left and right wheel spacing can be adjusted to 120 to 160 inches in the manner indicated by arrows A and B in FIG. 4. An adjustable wheel stance facilitates operation and travel over uneven terrain and permits incremental row cropping. For instance, rows as narrow as 30 to 40 inches can be accommodated with the vehicle wheels adjusted to pass between rows of crop with minimal or no damage thereto. Thus the base of the vehicle 20, defined by the points of contact of the four wheels 25, 29 with the ground, can be adjusted to suit both the terrain and the task at hand.

I claim:
1. A vehicle capable of receiving interchangeable front mounted attachments, the vehicle comprising:
   a chassis having a front section and a rear section, each section supported by respective wheels,
   active suspension means for mechanically coupling the wheels to the chassis, wherein the active suspension means controls a height between the chassis and the wheels and is operably able to dampen and absorb motion of the wheels relative to the chassis so as to maintain the chassis at a uniform height;
   an operator's cab mounted on the front section;
   means on the front sections for mounting interchangeably one of a plurality of different attachments;
   an engine mounted on the rear section for propelling the vehicle;
   an articulated joint having a horizontal and vertical axis connecting the front and rear sections, the articulated joint permitting relative lateral movement between the front and rear sections about the vertical axis and relative axial rotation between the front and rear sections about the horizontal axis; and
   wherein the front and rear wheels are spaced from the articulated joint so that a path of the rear wheels substantially follows a path of the front wheels when the vehicle turns.
2. A vehicle of claim 1 wherein the articulated joint is an oscillating articulated joint, which allows the front and rear sections of the vehicle to pivot and move independently of each other about the oscillating articulated joint, whereby the wheels maintain full contact with a ground surface.
3. A vehicle of claim 1 wherein the vehicle is a high clearance tractor.
4. A vehicle of claim 1 wherein the engine counterbalances a front mounted attachment.
5. A vehicle of claim 1 wherein the distance between mar wheels is adjustable.
6. A vehicle of claim 1 wherein the distance between front wheels is adjustable.
7. A vehicle of claim 1 wherein a swather head or a high clearance sprayer is mounted on said front section.
8. A vehicle of claim 1, wherein the active suspension means is an air spring suspension system.
9. A vehicle of claim 1, wherein the active suspension means is an air bag suspension system.
10. A vehicle capable of receiving interchangeable front mounted attachments, the vehicle comprising:
    a chassis having a front section and a rear section, each section supported by a respective front and rear wheels;
    an active suspension for mechanically coupling the respective front and rear wheels to the front and rear sections and independently maintaining the front and rear sections at a uniform height relative to the ground;
    an operator's cab mounted on the front section;
    an attachment device on the front section for mounting interchangeably one of a plurality of different attachments;
    an engine mounted on the rear section for propelling the vehicle; and
    an articulated joint having a horizontal and vertical axis connecting the front and rear sections, the articulated joint permitting relative lateral movement between the front and rear sections about the vertical axis and relative axial rotation between the front and rear sections about the horizontal axis; and
    wherein the front and rear wheels are spaced from the joint so that a path of the rear wheels substantially follows a path of the front wheels when the vehicle turns.
11. An articulated vehicle capable of receiving interchangeable front mounted attachments for performing different farming and construction tasks, the articulated vehicle comprising:
    a segmented chassis having a front portion supporting an operator's cabin and a rear portion having an engine for propelling the vehicle;
    at least a first and second independent front wheels supporting the front portion and at least a first and second independent rear wheels supporting the rear portion;
    an active wheel suspension mechanism coupling each said first and second independent front and rear wheels to the respective front and rear portions of the segmented chassis;
    an attachment apparatus positioned on the front portion for mounting interchangeably one of a plurality of different farming and construction tool attachments; and
    wherein the front and rear portions of the segmented chassis are connected by an articulated joint having a separate vertical axis and a horizontal axis permitting simultaneous relative oscillation between the front and rear portions in both a horizontal and vertical plane to ensure that each said first and second independent front and rear wheels are maintained in full contact with an undulating ground surface.
12. The articulated vehicle as set forth in claim 11, wherein the front and rear wheels are equidistantly spaced from the joint connecting the front and rear portions of the chassis so that a path of the rear wheels substantially follows a path of the front wheels when the vehicle turns in order to reduce crop damage.
13. The articulated vehicle as set forth in claim 11, further comprising a hydrostatic drive wherein each said first and second independent front and rear wheels are independently driven by separate motors powered by a hydrostatic oil pump driven by the engine.
14. The articulated vehicle as set forth in claim 11 wherein the front and rear portion of the segmented chassis are also connected by at least a stabilizing cylinder adjacent the joint to facilitate articulated steering of the vehicle.
15. The articulated vehicle as set forth in claim 11 wherein the first and second independent rear wheels are parallel spaced from one another.
16. The articulated vehicle as set forth in claim 11, wherein the first and second independent front wheels are axially adjustable relative to one another.
17. An articulated vehicle capable of receiving interchangeable front mounted attachments for performing different farming and construction tasks, the articulated vehicle comprising:
    a segmented chassis having a front portion supporting an operator's cabin and a rear portion having an engine for propelling the vehicle;
    at least a first and second independent front wheels supporting the front portion and at least a first and second independent rear wheels supporting the rear portion;
    an active wheel suspension mechanism independently coupling each said first and second independent front and rear wheels to the respective front and rear portions of the segmented chassis;

an attachment apparatus positioned on the front portion for mounting interchangeably one of a plurality of different farming and construction tool attachments;

the front and rear portions of the segmented chassis are connected by an articulated joint having a vertical axis and a horizontal axis permitting simultaneous relative oscillation between the front and rear portions in both a horizontal and vertical plane to ensure that each said first and second independent front and rear wheels are maintained in full contact with an undulating ground surface;

the front and rear wheels are equidistantly spaced from the joint connecting the front and rear portions of the chassis so that a path of the rear wheels substantially follows a path of the front wheels when the vehicle turns in order to reduce crop damage; and the vehicle is provided with a hydrostatic drive wherein each said first and second independent front and rear wheels are independently driven by separate motors powered by a hydrostatic oil pump driven by the engine to provide increased clearance of the vehicle.

* * * * *